United States Patent
Pedersen et al.

(10) Patent No.: US 6,207,061 B1
(45) Date of Patent: Mar. 27, 2001

(54) METHOD AND DEVICE FOR FILTERING OF HYDROCARBON CONTAMINATED WATER BY MEANS OF HYDROCARBONS

(76) Inventors: Helge Pedersen, Hananbakken 40, N-1529 Moss; Jan Erik Pedersen, Ryggeveien 238, N-1580 Rygge, both of (NO)

(*) Notice: Subject to any disclaimer, the term of this patent is extended or adjusted under 35 U.S.C. 154(b) by 0 days.

(21) Appl. No.: 09/319,856
(22) PCT Filed: Dec. 10, 1997
(86) PCT No.: PCT/NO97/00330
  § 371 Date: Jun. 9, 1999
  § 102(e) Date: Jun. 9, 1999
(87) PCT Pub. No.: WO98/28229
  PCT Pub. Date: Jul. 2, 1998

(30) Foreign Application Priority Data

Dec. 11, 1996 (NO) ................................................ 965296
Dec. 9, 1997 (NO) ................................................ 975788

(51) Int. Cl.$^7$ ................................................ C02F 1/40
(52) U.S. Cl. .................. 210/708; 210/799; 210/801; 210/320; 210/521; 210/540; 210/DIG. 5
(58) Field of Search .................... 210/799, 800, 210/801, 802, 803, 804, 248, 521, 532.1, 537, 538, 540, 708, 320, DIG. 5

(56) References Cited

U.S. PATENT DOCUMENTS 2,284,737 * 6/1942 Hirshstein .
3,862,040 * 1/1975 Preus et al. ........................... 210/253
4,132,652 * 1/1979 Anderson et al. .................... 210/536
5,132,010 * 7/1992 Ossenkop .............................. 210/121
5,679,265 * 10/1997 Van Schie ............................. 210/521

* cited by examiner

*Primary Examiner*—Robert J. Popovics
(74) *Attorney, Agent, or Firm*—Abelman, Frayne & Schwab

(57) ABSTRACT

A method for filtering hydrocarbon contaminated water for separation and recovery of the contaminants and recirculation of the water, wherein the water contaminated by hydrocarbons is, in a series of successive stages, caused to flow down through a cushion of a filtering hydrocarbon that floats on a defined surface of a water body and is permitted to flow via an underflow into the free portion of the water body prior to transfer via an overflow to the next stage, and where, in a final stage, approximately anhydrous hydrocarbon is drawn off as overflow while hydrocarbon-free water is removed as underflow, is carried out with the aid of an apparatus which, in operable state, comprises a series of successive basins filled with water (2, 3, 4) separated by walls (22, 23), where an upper part of each basin is bounded by means of fixed partition walls (32, 33) projecting downward in the water and is filled with a filtering hydrocarbon (12, 13, 14), where the final cushion of filtering hydrocarbon (14) downstream is bordered by a vertically displaceable outlet bin (47) for the contamination enriched hydrocarbon, and further comprising a water outlet (5, 6, 7, 8) comprising two successive horizontal watercourses (5, 6), having a declining ceiling (10, 11) in the direction of flow, and thereafter a vertical S-pipe (7, 17) having an outlet (8).

4 Claims, 2 Drawing Sheets

METHOD AND DEVICE FOR FILTERING OF HYDROCARBON CONTAMINATED WATER BY MEANS OF HYDROCARBONS

BACKGROUND OF THE INVENTION

1. Field of the Invention

The present invention relates to a method for filtration of hydrocarbon contaminated water for separation and recovery of contaminants and recirculation of the water.

The invention also relates to an apparatus for carrying out this method.

The invention may be utilized, for example, in connection with operations of the type relating to metal working, where lubricating oil is added in small amounts to the cooling water to clean the outflow from the processing site, or to separate oil from the waste water discharged, for example, from automobile repair shops with associated motor wash facilities.

One can also conceive of other operations, however, where oil in small amounts is used in water for various purposes.

2. Description of the Related Art

In separating oil from water it is usually relatively simple to remove the most predominant part of the oil in relatively simple separation steps; the difficulties arise with the last, marginal removal of oil.

Filters and other devices have been tried, but in quite numerous cases the complexity and costs related to such systems have been prohibitive and have prevented their installation in smaller factories/facilities.

The objective of the present invention is to provide a technology that is easy to install, that requires very little space, and that may be installed with simple auxiliary agents in connection with the vast majority of operations where there is a need for separation of small amounts of oil, for example, from relatively large quantities of a carrier fluid, in most cases water.

Brief Summary of the Invention

The invention is based on the recognition that a compact body of oil is capable of functioning as a filter for finely dispersed or suspended oil drops in a stream of water while the water stream is permitted to pass through the body.

The apparatus that is described according to the invention will hereafter be referred to as a "cascade," since it describes a cascade of successive oil bodies or cushions in connection with successive underflows and overflows out of and into them.

Through the use in this way of a plurality of oil bodies as filters in a cascade, one will by adapting the number of cascade stages to the registered contamination load obtain water of a considerably improved quality, which may be emitted without risk into public drains.

In accordance therewith, the present invention relates to a method for filtering hydrocarbon contaminated water for separation and recovery of the contaminants and recirculation of the water, and the method is characterized in that the water contaminated by hydrocarbons is, in a series of successive stages, caused to flow down through a cushion of a filtering hydrocarbon that floats on a defined surface of a water body and is permitted to flow via an underflow into the free portion of the water body prior to transfer via an overflow to the next stage, and where, in a final stage, approximately anhydrous hydrocarbon is drawn off as overflow while hydrocarbon-free water is removed as underflow.

As mentioned above, the invention also relates to an apparatus for carrying out this method, and the apparatus is characterized in that, in operable state, it comprises a series of successive basins separated by walls, filled with water, where an upper part of each basin is bounded by means of fixed partition walls projecting downward in the water and is filled with a filtering hydrocarbon, where the final cushion of filtering hydrocarbon downsteam is bordered by a vertically displaceable outlet bin for the contamination enriched hydrocarbon, and further comprising a water outlet comprising two successive horizontal watercourses, having a declining ceiling in the direction of flow, and thereafter a vertical S-pipe having an outlet.

As construction this apparatus is characterized in that it comprises a series of successive basins separated by walls, where the upper part of each basin is bounded by means of fixed partition walls projecting downward and where the final basin downstream has a vertically displaceable outlet bin and further comprises a water outlet comprising two successive horizontal courses having a declining ceiling in the direction of flow, and thereafter a vertical S-pipe having an outlet.

Brief Description of the Several Views of the Drawings

The invention shall be illustrated in more detail with reference to the accompanying drawings, wherein.

Detailed Description of the Invention

Figure 1:
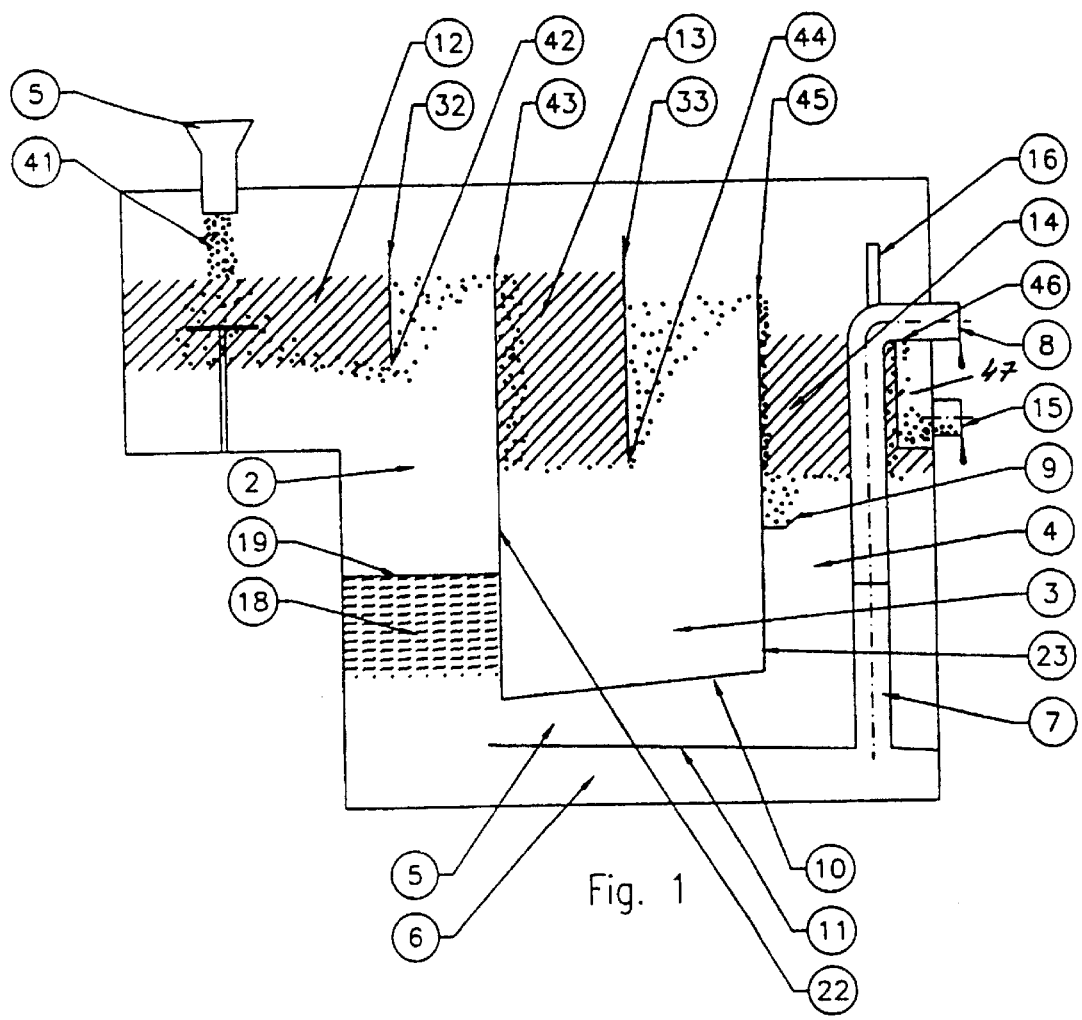
FIG. 1 shows a lateral view of the apparatus according to the invention.

A mixture 41 of oil in a finely dispersed form in water is fed to apparatus 1 via funnel 5. A body 12 of oil serves as a receiver. Oil body 12 in principle floats on, and is additionally separated from, water body 2 by means of a partition wall 32, the lower end 42 of which creates an underflow.

The oil 12 serves as a filter for the oil in mixture 41. As fluid gradually builds up in the form of the cushion 12, a mixture of somewhat larger oil drops in water will be pressed under the underflow 42 and into body 2, whereafter the somewhat larger oil drops will float toward the top surface of body 2. Partition wall 22 between water body 2 and the water body 3 successive thereto forms an overflow threshold at 43, and an oil enriched water-oil mixture flows into oil cushion 13 which, in the same manner as cushion 12, floats on water body 3 and is separated therefrom by partition wall 33, which at its lower end creates an underflow 44.

As the fluid gradually fills up over the overflow 43, an oil-water mixture will be pressed under the underflow 44 by partition wall 33 and into water body 3, where oil will float toward the surface.

To ensure the flow of fluid through the apparatus, overflow 45 is situated at a lower level than overflow 43, and overflow 46 at a lower level than overflow 45.

Oil which floats up to the top surface from underflow 44 will flow over the overflow threshold 45 at the upper end of partition wall 23. In the figure shown, water body 3 represents the penultimate stage, and water body 4 following thereafter, separated from body 3 by wall 23, represents the final stage in the cascade.

More stages could very well be imagined, however, in accordance with the requirements and desires that the user has.

In contrast to the oil cushions 12 and 13 that cover only a portion of the surface of the respective stages, represented by oil bodies 2 and 3, the oil bodies 14 in the final stage cover the entire top surface of and float on the water bodies 4.

As has been demonstrated in practical use, the liquid mixture that runs over overflow threshold 45 is already so enriched by oil that oil as a product can be recovered via overflow 46 after the remaining water has moved through oil cushion 14 and into water body 4.

Overflow 46 is situated on an outlet bin 47, which is provided in addition with an oil outlet 15.

Figure 2:
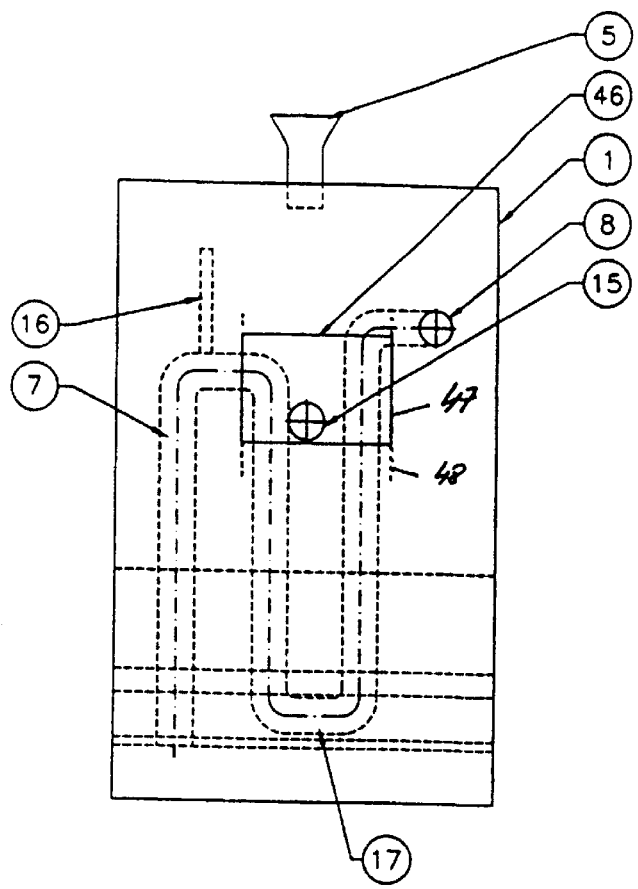
FIG. 2 shows a view the apparatus toward the outlet end.
Figure 3:
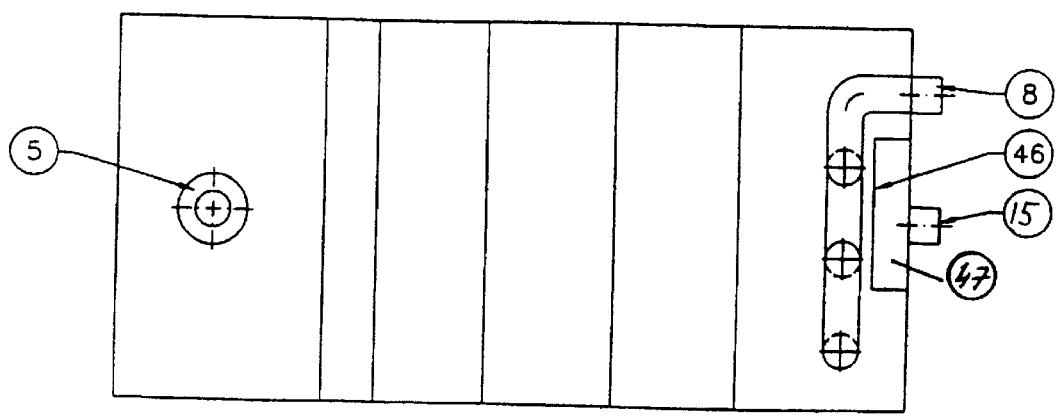
FIG. 3 shows a top view of the apparatus of the invention.

This bin 47, in accordance with a feature of the invention, is vertically displaceable as indicated by the dotted lines 48 in FIG. 2. This vertical displacement permits is utilization of the invention's apparatus also in those situations where the base surface is not completely horizontal.

Indicated by numeral 9 is a collection trough for any entrained components having a density preventing them from being trapped by oil cushions 12, 13 and 14, or for any existing entrained oil.

The water stream is conducted from water body 4 into a funnel-shaped part 5, bounded by a downward sloping wall 10 and an upward sloping wall 11, and is then turned around the end of wall 11 and into part 6 before the water is conducted out through riser 7 and, finally, out through outlet 8.

In the illustrated constructional form, water body 3 with oil cushion 13 is completely separated from the upstream-situated water body 2 by partition wall 22, from the downstream-situated water body 4 with oil cushion 14 by partition wall 23, and from watercourse 5 by bottom wall 10.

Water body 2 is separated at the bottom thereof from watercourse 5 by the turn into watercourse 6 separated therefrom by a partition wall 19.

Experience has shown that it is advantageous to place an air cushion 18 under partition wall 19; this is assumed to have the effect of a resilient buffer to catch and absorb any unwanted impact loads in the cascade.

The sloping of wall 10 is intended to permit any entrained oil to move countercurrently and back into body 4; the slanted wall has, in principle, the same mission as trough 9, i.e., to trap, if necessary, components not wanted in the outlet water 8.

Although it is of course possible for water to be removed via outlet 8 directly from riser 7, it has proven advantageous in practice, as indicated in FIG. 2, to insert a U-pipe 17.

At the top of riser 7 is provided a vent pipe 16 which prevents the formation of air pockets and thereby ensures a uniform stream from outlet 8.

A cascade of the illustrated type may be constructed with a total length of about 1 ½ meters from the upstream end of the first cascade stage to the outlet openings, and a total width of under ¾ meters, all having a total height of under 1 ¼ meters.

Practical trials have shown that it is possible to treat a quantity of water of 2 to 3 m$^3$ per hour, to produce a waste water that is acceptable for discharge.

The cascade as described above offers a number of advantages.

It is simple, easy to construct, easy to maintain and, therefore also reasonable in cost.

Due to the rather modest dimensions described, there would be space for the apparatus in almost any location; thus it could also be placed indoors, or in a relatively simple enclosure outside, which would also enable its full utilization during the cold period of the year.

Since the apparatus of the invention consists only of mechanically stationary parts, it is in addition very reliable in operation, stable and mobile.

The invention thus represents a considerable contribution toward the combatting of contaminants of a type which may appear to be inconsequential, but which on closer inspection prove to be relatively major despite the fact that they are difficult to register.

What is claimed is:

1. A method for filtering hydrocarbon contaminated water for separation and recovery of the contaminants and recirculation of the water, which comprises:

filtering the hydrocarbon contaminated water by causing it to flow downwardly through a series of successive basins filled with water (2, 3, 4) separated by walls (22, 23), an upper part of each basin bounded by fixed partition walls (32, 33) projecting downwardly in the water and filled with filtering hydrocarbon cushions (12, 13, 14), the final downstream cushion of filtering hydrocarbon (14) bordered by a vertically displaceable outlet bin (47) for the contamination enriched hydrocarbon, and further comprising a water outlet (5, 6, 7, 8) comprising two successive horizontal watercourses (5, 6), having a declining ceiling (10, 11) in the direction of flow, and thereafter a vertical S-pipe (7, 17) having an outlet (8).

2. The method according to claim 1, wherein a trough (9) is provided on the wall (23) for water body (4).

3. The method according to claim 2 wherein between the bottom (19) of the water body (2) and the water outlet (5) there is provided an air cushion (18).

4. The method according to claim 1, wherein between the bottom (19) of the water body (2) and the water outlet (5) there is provided an air cushion (18).

* * * * *